US006853841B1

(12) United States Patent
St. Pierre

(10) Patent No.: US 6,853,841 B1
(45) Date of Patent: Feb. 8, 2005

(54) PROTOCOL FOR A REMOTE CONTROL DEVICE TO ENABLE CONTROL OF NETWORK ATTACHED DEVICES

(75) Inventor: Robert P. St. Pierre, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 471 days.

(21) Appl. No.: 09/696,274

(22) Filed: Oct. 25, 2000

(51) Int. Cl.[7] .............................................. H04M 3/00
(52) U.S. Cl. ...................... 455/420; 455/345; 455/421; 455/424; 455/353; 709/220; 709/203; 707/104.1; 340/539
(58) Field of Search ................................ 455/420, 345; 709/220, 203; 340/539; 707/104.1

(56) References Cited

U.S. PATENT DOCUMENTS

| 6,263,344 B1 | * | 7/2001 | Wu et al. ................. 707/104.1 |
| 6,304,895 B1 | * | 10/2001 | Schneider et al. .......... 709/203 |
| 6,466,971 B1 | * | 10/2002 | Humpleman et al. ....... 709/220 |
| 6,480,889 B1 | * | 11/2002 | Saito et al. ................. 709/220 |
| 6,542,076 B1 | * | 4/2003 | Joao ........................... 340/539 |

FOREIGN PATENT DOCUMENTS

EP 0549541 A * 6/1993

* cited by examiner

Primary Examiner—David Hudspeth
Assistant Examiner—David Nguen
(74) Attorney, Agent, or Firm—Lahive & Cockfield, LLP

(57) ABSTRACT

The present invention addresses the difficulties of controlling new devices which have been added to a network. A network protocol, the NetCTL protocol, enables a remote control device to dynamically learn the command codes of a newly network attached device if the new device is executing the protocol. The intervention of a system administrator is not necessary since the dynamic teaming process happens automatically when the new device is attached to the network. Because the protocol allows the remote control device to learn the codes dynamically, there is no need to consult previously written tables of commands which can omit the codes for newly invented devices. A user of the remote control device which has "learned" the codes (i.e. acquired the codes) for a network attached device is able to control that device, regardless of the device's physical location, by selecting and sending the network attached device a command code to perform an operation.

17 Claims, 20 Drawing Sheets

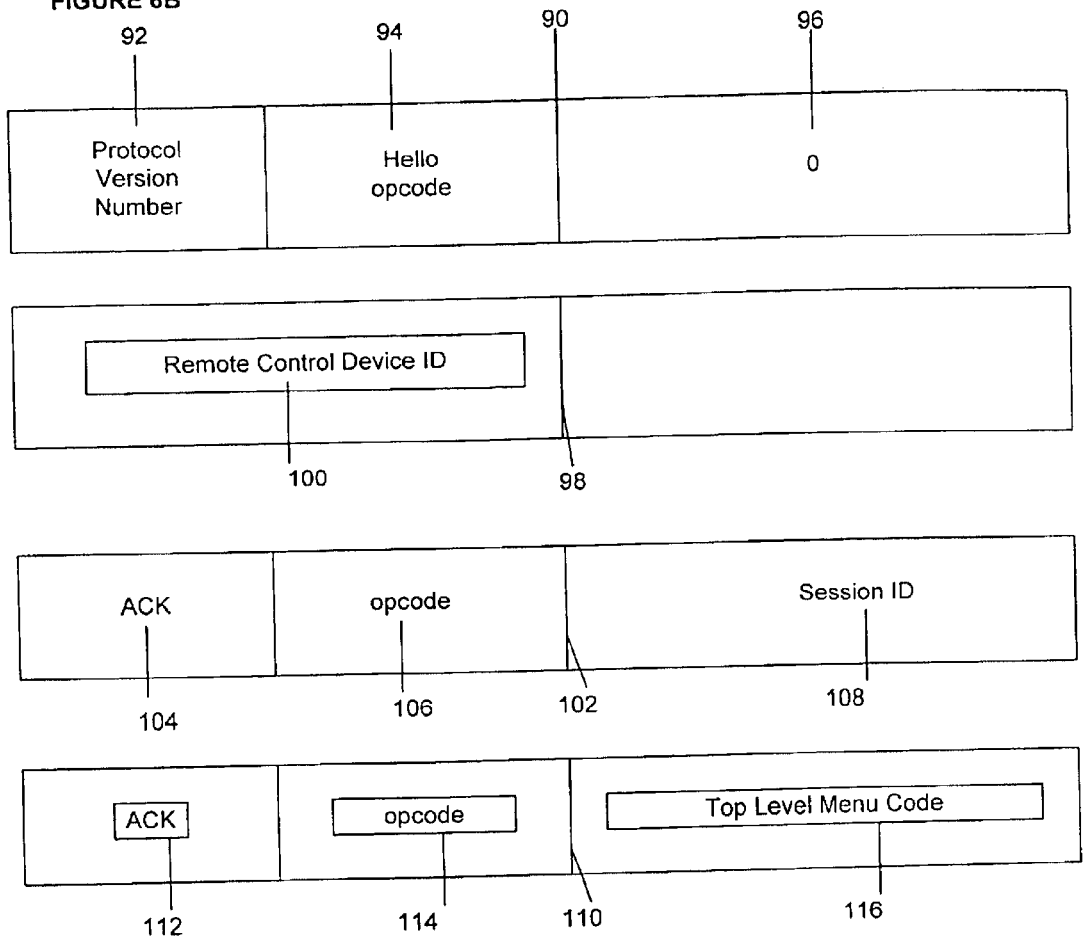

PROTOCOL FOR A REMOTE CONTROL DEVICE TO ENABLE CONTROL OF NETWORK ATTACHED DEVICES

TECHNICAL FIELD

The present invention relates generally to the control of devices attached to a network, and more particularly to a protocol facilitating the control of multiple network attached devices by a remote control device.

BACKGROUND OF THE INVENTION

Consumer electronic devices are often controlled by remote controls. Typically these remote controls or "remotes" are handheld devices having a series of buttons. Some remotes have a limited LED display and, in the case of "all in one" or "multi-remotes", control more than one device. Devices which are traditionally controlled by such remotes include televisions, VCR's, stereo receivers, CD players and other similar devices.

The remotes control the devices by sending the device a command code that is encoded in an infrared (IR) signal. The command code causes the device to execute a particular operation. For instance, the remote may send an "off" command to the TV which causes the TV to turn off. Each device has its own unique set of commands and corresponding command codes. The remote has to be manually programmed for each device it seeks to control. For example, to program a device, a user may be instructed to enter a device code (such as 247) by pressing numbers on the keypad of the remote. For a second device, the user might be instructed instead to enter the device code of 249. The device code serves as an index into a code table which has been pre-programmed into the remote. The code table identifies the proper command codes for the associated device. A user can then use the remote to control the device whose codes the remote has identified.

This current approach has some major drawbacks. First, the approach does not readily accommodate new devices. The remote does not have access to command codes for the new devices because the pre-programmed tables of codes pre-date the new device's date of creation and are structurally fixed. Additionally, this approach requires the manual configuring of the remote by a user who may or may not perform the procedure correctly. An additional problem is that, the majority of remotes that are in use today are "line of sight" remotes that require close proximity with no obstacles between the remote and the de vice. The IR signals must have an unobstructed path from transmitter to receiver in order to be effective. Yet another problem is that the types of devices capable of being controlled by a remote are restricted for the most part to consumer electronic devices for which the remotes are programmed in advance.

SUMMARY OF THE INVENTION

The present invention addresses the difficulties of controlling new devices which have been added to a network. A network protocol, hereafter the NetCTL protocol, enables a remote control device to dynamically learn the command codes of a newly network attached device if the new device is executing the protocol. The intervention of a system administrator is not necessary since the dynamic learning process happens automatically when the new device is attached to the network. Because the protocol allows the remote control device to learn the codes dynamically, there is no need to consult previously written tables of commands which can omit the codes for newly invented devices. A user of the remote control device which has "learned" the codes (i.e. acquired the codes) for a network attached device is able to control that device regardless of the device's physical location.

In accordance with one aspect of the present invention, a method is practiced whereby the protocol enables a remote control device having a network interface to dynamically learn the command codes of a device attached to the network. The network attached devices whose commands are capable of being learned by the remote control device can take many forms such as kitchen appliances, stereo equipment, computer equipment, etc. Any network attached device that uses command codes and is equipped with the protocol can be located by the remote control device. Once the remote control device has team led the command codes, a user of the remote control device can use the remote control device to control the network attached device by sending the learned command codes to that network attached device. An example of the use of the protocol would have a user with access to a remote control device in a house's bedroom sending command codes to a stove in the kitchen and a stereo in the living room. The protocol enables the remote control device to control types of devices attached to the network which traditionally have not operated via remote control.

In accordance with another aspect of the current invention, the network environment is in a motor vehicle and a method is practiced whereby the protocol enables a remote control device having a network interface to dynamically learn the command codes of a device attached to the automobile network. The network attached devices themselves can take many forms. Any network attached-device connected to the automobile network that uses command codes and is equipped with the protocol can be located by the remote control device. Once the remote control device has "learned" the command codes, a user can use the remote control device to control the network attached device by sending command codes to that network attached device.

BRIEF DESCRIPTION OF THE DRAWINGS

FIG. 6B is a block diagram showing the frame format used in the body of the Hello Request and the Hello Response of FIG. 6;

DETAILED DESCRIPTION OF THE INVENTION

The illustrative embodiment of the present invention employs a protocol (i.e. the NetCTL protocol) that facilitates a remote control device locating other network attached devices. The protocol also enables the remote control device to dynamically learn command codes for network attached devices a nd then use those command codes to control the network attached devices. The set of device types that can be controlled by the remote control device is not statically fixed and is limited only by the number of devices on the network executing the protocol and hardware limitations of the remote control device.

The protocol is designed to be used in a network, such as a computer network that supports the TCP/IP protocol suite. Because protocol communications are carried over the network, there is no need for the remote control device to be in physical proximity or "line of sight" with the controlled device. In fact, the remote control device's network interface can be either a physical interface or a wireless interface. Moreover, the types of devices that may be controlled by the remote control device includes devices that are not typically controlled by an Infrared remote control device.

Figure 1:
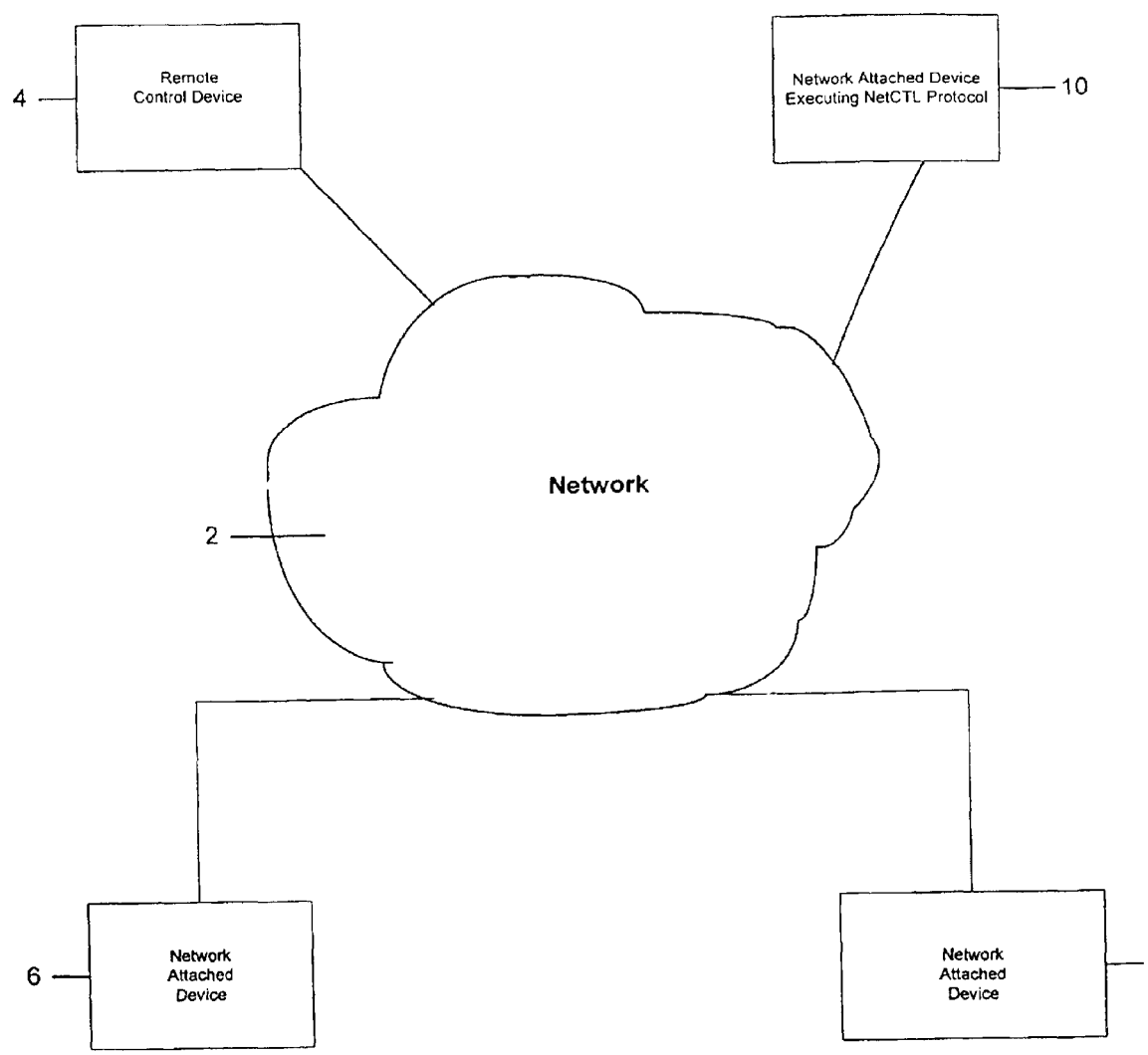
FIG. 1 is a block diagram showing an illustrative embodiment of the present invention.

FIG. 1 depicts an environment suitable for practicing the illustrative embodiment of the present invention. The environment includes a network 2 to which devices 4, 6, 8, 10 are interfaced. The devices include a remote control device 4 that supports the NetCTL protocol. The devices also include network attached devices 6 and 8 that do not support the NetCTL protocol (and network attached device 10 that supports the NetCTL protocol). The remote control device 4 may control all of the attached network devices 6, 8 and 10, even the devices 6 and 8 that do not support the protocol. It is presumed that the remote control device 4 is already aware of the network attached devices 6 and 8 but is not yet aware of network attached device 10 in the depiction of FIG. 1.

Those skilled in the art will recognize that the components shown in FIG. 1 are intended for illustration purposes only and are in no way meant to be limiting. The present invention may be practiced on networks having different topologies and possessing different network devices. The network may be an Internet Protocol (IP) based network capable of sending and routing packets over the Internet. If the network is an IP based network, both the remote control device and any network attached devices executing the NetCTL protocol will also use the Service Location Protocol (SLP) as part of the device identification/registration process. The Service Location Protocol (SLP) is a protocol established by the Internet Engineering Task Force (NetCTL) that simplifies the discovery of network resources.

The protocol utilizes the concept of User Agents, Service Agents and Directory Agents. Applications running on a computer are represented by User Agents which understand the service and resource needs of the application. In the case of the present invention, the remote control device is represented by a User Agent. Each network device is represented by a Service Agent. Some networks have Directory Agents. The Service Agent sends out a multicast request for any Directory Agents on the network to make contact. If any Directory Agents respond, the Service Agent sends a registration unicast to each responding Directory Agent. The registration unicast includes the type of device the Service Agent is representing, the device's attributes, and the device's Uniform Resource Locator (URL) address. An attribute is a characteristic that can be used to distinguish one device from another. For example an attribute for a printer is color capability. Another attribute for the printer is its location. When a User Agent needs a particular service, it sends out a service request which includes both the type of service and attributes desired. If the network possesses a Directory Agent, the Directory Agent responds with a list of eligible devices and the devices Uniform Resource Locator (URL) address. If there is no Directory Agent on the network, the User Agent multicasts its service request on the network and the Service Agents for devices whose attributes match those requested respond directly to the User Agent.

In one embodiment of the present invention, the network is an Internet Protocol (IP) based network and the Service Location Protocol (SLP) is utilized to locate and identify available network attached devices, such as the network attached device 10. The NetCTL protocol utilizes the SLP in one of two ways depending on the configuration of the network 2. Upon being initially attached to the network, the Service Agent for a device executing the NetCTL protocol 10 multicasts a request for any available Directory Agents to contact the Service Agent. The Service Agent then unicasts a "registration" message to each responding Directory Agent. The registration message includes a text string identifying the name of the network attached device 10, the device's attributes, and the URL address giving the device's location on the network 2. The Directory Agent will subsequently forward this information to the remote control device 4 when the User Agent for the remote control device sends out a multicast request for a list of available network devices. If the network 2 does not have a Directory Agent, the User Agent for the remote control device 4 sends a multicast request out on the network directing Service Agents which represent devices which possess certain attributes to contact the User Agent. Regardless of which method is used, once the remote control device 4 receives the information for a device it wishes to contact, it can do so directly by sending messages to the device's URL address.

Figure 2:
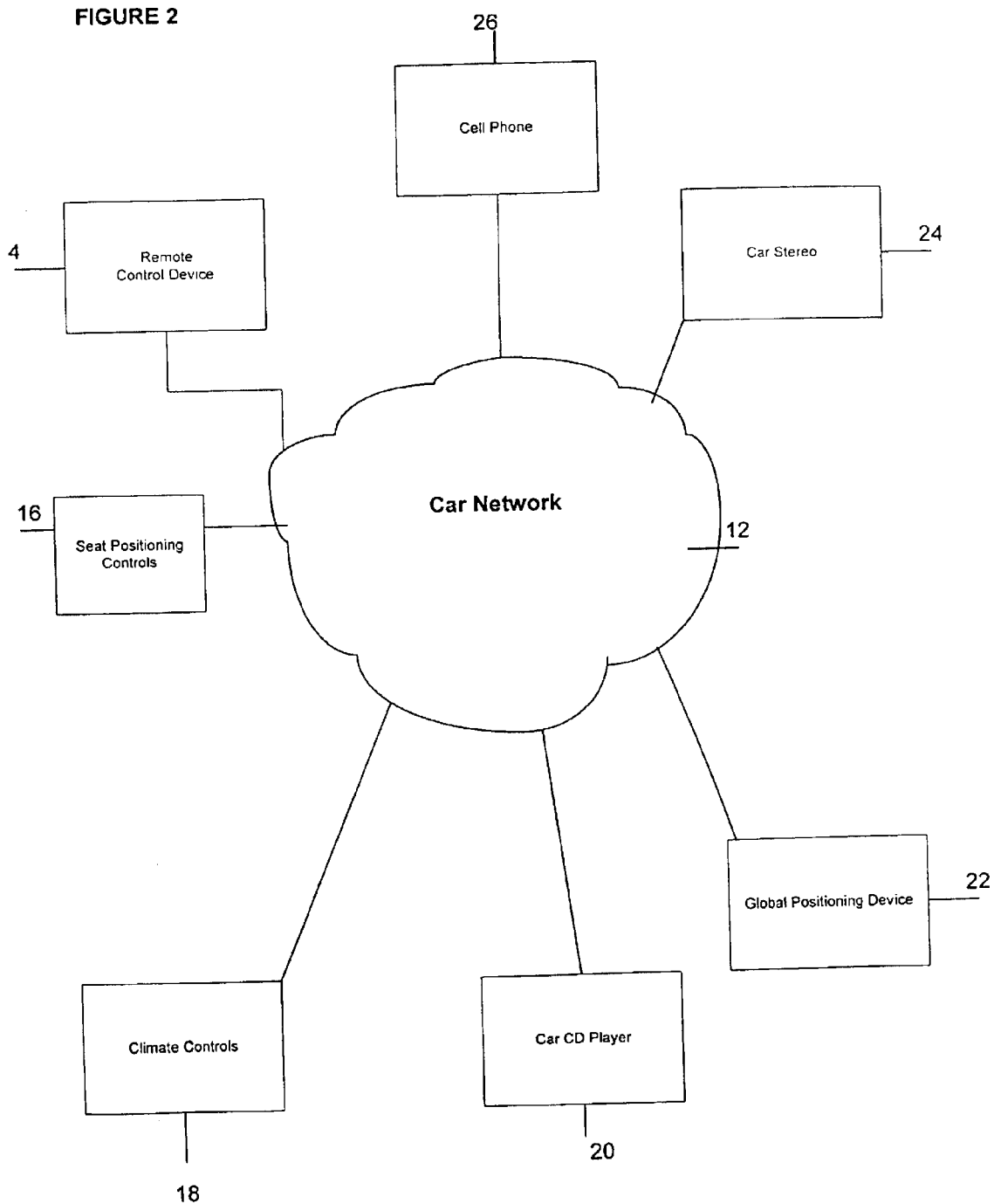
FIG. 2 is a block diagram showing an alternative embodiment of the present invention which includes a network that is located in a car.

FIG. 2 depicts an alternative embodiment of the present invention where the remote control device 4 is used in an automobile. The environment shown in FIG. 2 includes a car network 12 to which a Seat Positioning Control Device 16, a Climate Control Device 18 (heating and air conditioning), a CD player 20 and a Global Positioning Device 22 (used to provide mapping operations for the driver) are attached. A car stereo 24 and a cellular phone 26 are also connected to the network. The remote control device is capable of controlling all of the components 16, 18, 20, 22, 24, and 26 by sending communications on the internal car network 12.

The illustrative embodiment facilitates multiple network attached devices 10 being identified by the remote control device 4. After identification of the network attached device 110, the remote control device 4 dynamically learns the command codes of the identified network attached device through a sequence of protocol defined request and response messages. Once the remote control device 4 has received the codes for the network attached device 10, a user of the remote control device is able to select a device from among those devices that have been identified, and issue commands to that network attached device.

Figure 3:
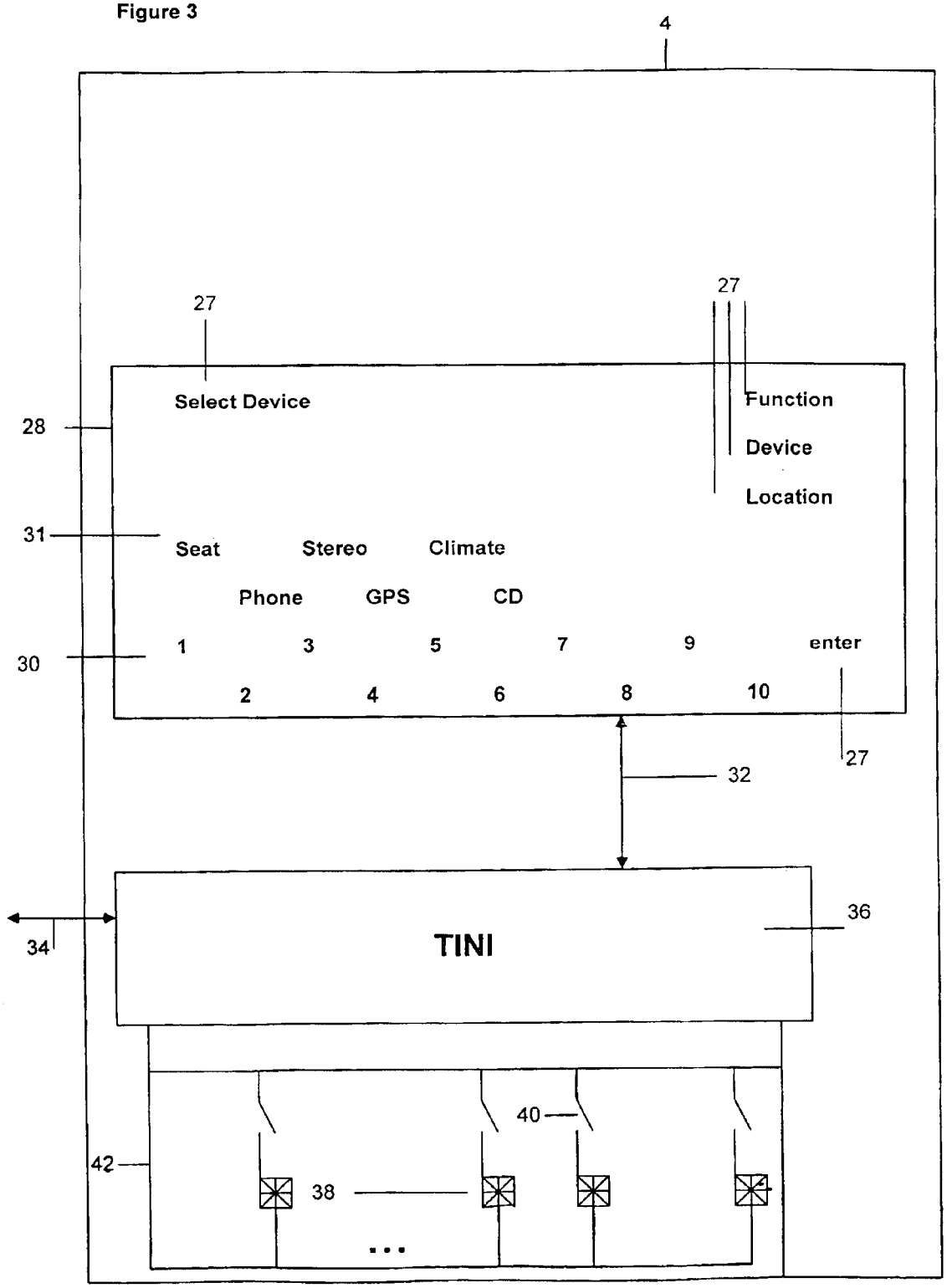
FIG. 3 is a block diagram depicting a remote control device used to execute the NetCTL protocol.

FIG. 3 depicts in more detail, an example of the remote control device 4. The remote control device 4 includes, a touch screen display surface 28. A graphical user interface (GUI) is shown on the touch screen display surface 28. The GUI includes numbers 1–10 (identified by reference number 30 in the figures) that may be depressed by a user to make a selection. The GUI also depicts the names 31 of the network attached devices that can be controlled by the remote control device 4. Each network attached device name 31 appearing on the display surface 28 corresponds to a graphical user interface simulating a button 30. For example, "Seat" corresponds with button "1". A user selects a particular device by touching the appropriate button and a request is sent to the selected device. The remote control device 4 includes a TINI board 36 (provided by Dallas Semiconductor, Inc.) with a serial port 32 and a network interface 34. The TINI board 36 contains a processor for executing instructions. The remote control device 4 also includes a 1 wire bus 42 and a plurality of switches 40 and ID chips 38 corresponding to the number of simulated buttons. Each "button" has 1 switch 40 and identity chip 38 assigned to it. The depression of a button closes the corresponding switch 40 which activates the identity chip 38. The identity chip 38 sends a signal bearing its ID to the TINI 36 which then sends a NetCTL protocol request to the selected device by way of the network interface 34.

The images depicted on the touch screen display surface 28 will vary according to the stage of communication between the electronic remote control device 4 and network attached devices. Thus after the user selects one of the network attached devices, a new screen may be shown to provide the user with appropriate choices.

A practitioner of the art will recognize that the physical composition of the remote control device 4 can take many different forms. For example the display surface can be a standard LCD display or a regular computer monitor screen rather than a touch screen and the simulated buttons may be replaced by mouse buttons or keyboard keys rather than through the use of a touch screen. Alternatively, the buttons next to the display surface which a user would manually depress. Additional embodiments of the invention are also possible. However, regardless of the form of the physical makeup of the buttons 30 on the remote control device 4, the protocol functions identically in handling communications with the network attached devices.

When the user of the remote control device 4 selects the device that they are interested in by pressing/clicking on the button 30 associated with the name of a device on the network, button being either physical or virtual, a request for the operational command codes for that device is sent over to the network attached device 10. The NetCTL protocol includes several formats for replies to the command request. The format that is used is dictated by the capabilities of both the remote control device 4 and the network attached device 10. In the case of a first format, the network attached device replies to the request with the command codes for the device accompanied by a text string. A second format enables the network attached device 10 to return its command codes accompanied by a graphic image. A format enables the selected device to return its command codes accompanied by a text string and graphic image combination to the remote control device 4.

By way of example, three allowable formats, which are described in more detail below are summarized in this chart for hypothetical responses from a selected VCR:

| First Format code | Accompanying Text String |
|---|---|
| 000 | "Stop" |
| 001 | "Play" |
| 010 | "Fast Forward" |
| 011 | "Reverse" |
| 100 | "Record" |
| 101 | "Pause" |

| Second Format code | Accompanying graphic |
|---|---|
| 000 | □ |
| 001 | ▷ |
| 010 | ▷▷ |
| 011 | ◁ |
| 100 | ○ |
| 101 | = |

| Third Format code | | text and graphic |
|---|---|---|
| 000 | □ | "Stop" |
| 001 | ▷ | "Play" |
| 010 | ▷▷ | "Fast Forward" |
| 011 | ◁ | "Reverse" |
| 100 | ○ | "Record" |
| 101 | = | "Pause" |

In the event the first format is used, the text string is shown on the touch screen display surface 28. In the event the second format is used, the graphical image is shown on the touch screen display surface 28. In the event the third format is used, both the text string and the graphical image are shown on the display surface 28. If a format is requested by the remote control device 4 that the network attached device 10 cannot satisfy (i.e. a request to a network attached device to send an image graphic when the network attached device supports only text messages, or a request for a JPEG type image when the network attached device supports only GIF images), an error message is returned to the remote control device, and the remote control device subsequently requests another format that both devices can utilize. Each command ret listed on the touch screen display surface 28 is associated with one of the buttons 30 of the remote control device 4. The user clicks on a button 30 associated with an operational command, and the command code is sent back to the network attached device. Upon receiving the command code, the network attached device 10 attempts to execute the command and returns an acknowledgment of success or an error message to the remote control device 4.

Figure 4A:
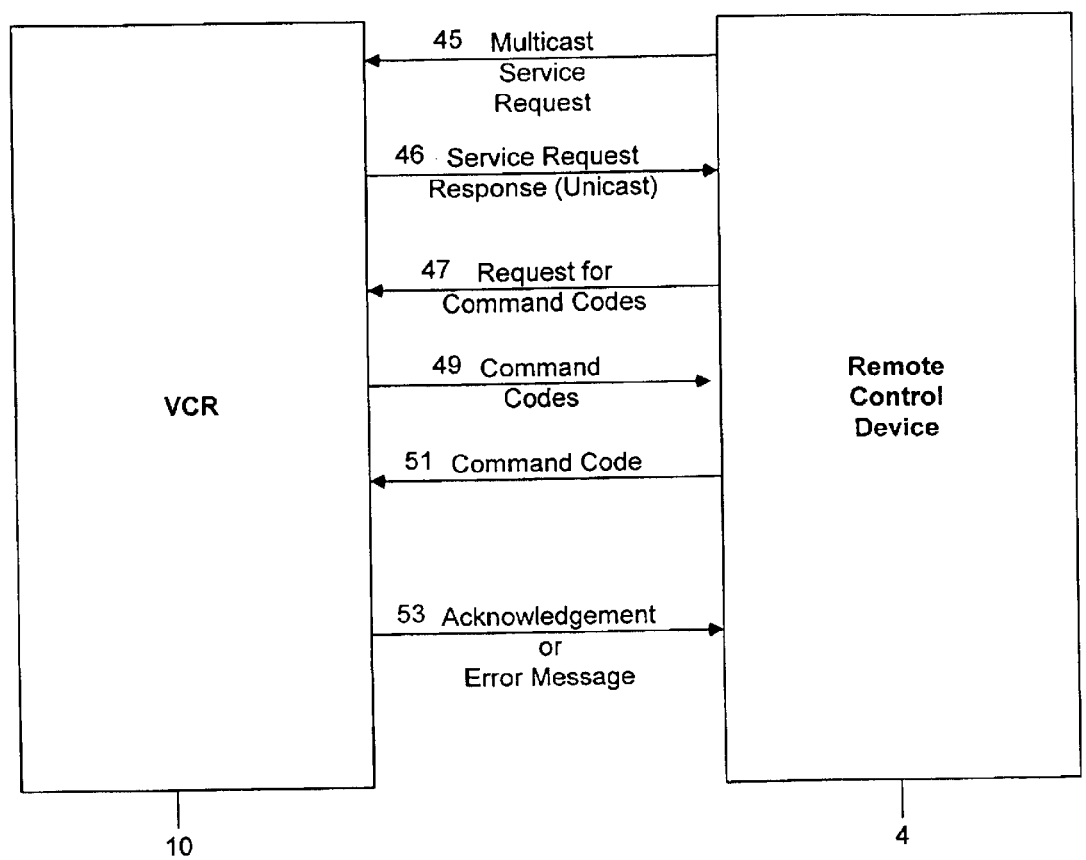
FIG. 4A is a block diagram illustrating the sequence of messages occurring in one aspect of the illustrated embodiment that does not use a Directory Agent of the Service Location Protocol.

FIG. 4A depicts the exchange of messages between a remote control device 4 and a network attached device 10, a VCR. These two devices 4 and 10 are attached to a network which does not have a SLP Directory Agent. Since there is no Directory Agent, the multicast registration request sent out by the Service Agent for the VCR goes unanswered. With no Directory Agent, the Service Agent for the VCR 10 will listen to the network for service requests matching the services and attributes of the VCR. The User Agent for the remote control device 4 sends out a multicast request for Directory Agents. Upon getting no response, the User Agent will multicast a service request for the type of service the remote requires 45. The Service Agent for each device matching the requested service will unicast a response 46 back to the remote control device 4. Subsequently, the user of the remote control device 4 sees a list displayed on the display surface 28 of all of the available identified devices. In one embodiment of the present invention, the list includes the text string name that accompanied the URL of the network attached device in the registration multicast 45. The user of the remote control device 4 selects the VCR 10 by depressing the button (physical or virtual) 30 that corresponds to the VCR 10. The remote control device 4 sends a request 47 to the VCR 10 for the command codes of the VCR. Upon receipt of the command request, the VCR 10 sends a copy of its command codes 49 to the remote control device 4 via the network 2. The remote control device 4 displays the available commands on its display surface 28, and the user selects a command by depressing the associated button 30. The selection results in a command code 51 being sent to the VCR 10. The VCR 10 attempts to perform the command and sends either an acknowledgement or an error message 53 to the remote control device 4. Upon receipt of the acknowledgement or error message 53, the remote control device 4 waits for further selections by the user.

Figure 4B:
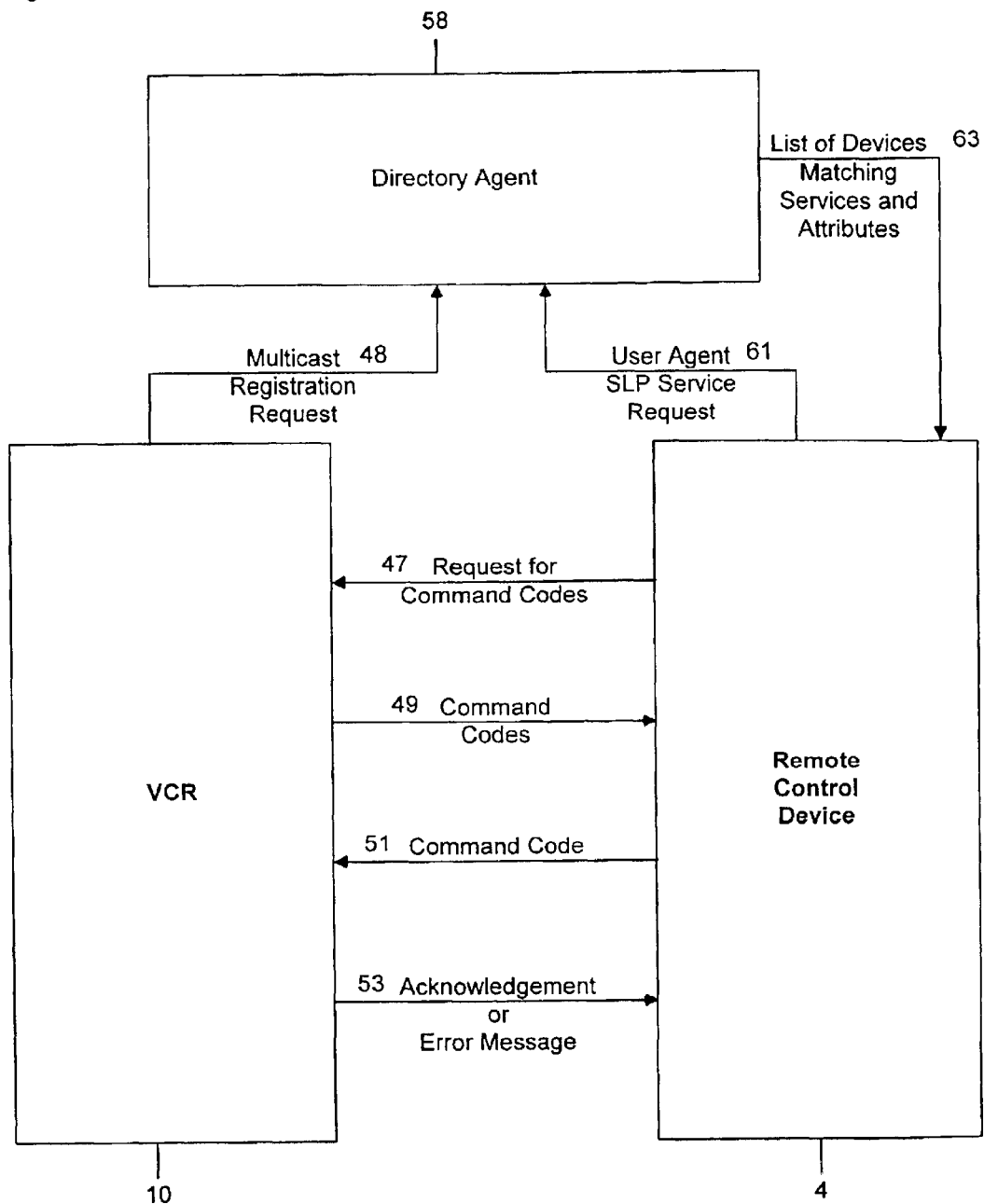
FIG. 4B is a block diagram illustrating the sequence of messages occurring in an alternative aspect of the illustrated embodiment that does use a Directory Agent of the Service Location Protocol.

FIG. 4B depicts the sequence of messages exchanged between a network attached device 10, a VCR, and a remote control device 4 that are utilizing the present invention on an IP based network which includes an SLP Directory Agent 58 to process SLP device registrations. The VCR 10, sends out a registration multicast request 48, utilizing the SLP protocol, to advertise its presence on the network. The registration multicast 45 is received by the Directory Agent 58 for the network 2 (FIG. 1). The Directory Agent 58 stores all of the registrations of the different network attached devices 10 as they occur. The User Agent for the remote control device 4 multicasts a request to identify available Directory Agents. The individual Directory Agents respond with identifying information. Subsequently, a user of the remote control device 4 selects an attribute descriptive of the type of devices the user wishes to control. Such an attribute may be for example, "video". The User Agent SLP service request 61 is forwarded to a Directory Agent 58 for processing. The SLP Directory Agent 58 responds to the request 61 by sending a list of all the devices matching the attribute class 63 back to the remote control device 4. The list matching the video attribute might be for instance "TV" and "VCR". The text string names are accompanied by the URLs of network attached devices. The user of the remote control device 4 selects a device to control from the list of those displayed 31, in this case the VCR 10. A request for command codes 47 is sent to the VCR 10. Upon receipt of the command code request 47, the VCR 10 sends a copy of its command codes 49 to the remote control device 4 via the network 2. The remote control device 4 displays the available commands on its display surface 28 and the user selects one by depressing a button 30. The selection sends the selected command code 51 to the VCR 10. The VCR 10 attempts to perform the command and then sends either an acknowledgement of successful operation performance or an error message 53 to the remote control device 4. Upon receipt of the acknowledgement or error message 53, the remote control device 4 waits for further selections by the user. Those skilled in the art will recognize that there can be countless sequences of different message exchanges within the scope of the present invention and the above examples are offered only for the purpose of illustration and are not meant to be a restrictive list of the possible exchanges.

The present invention dictates the form of the conversation between the remote control device 4 and the network attached devices 10 executing the protocol. The protocol works on a request-response model, where the remote control device 4 executes the client side of the protocol and initiates the requests, and the network attached device 10 executes the server side of the protocol and initiates the responses. The format of the most common exchanges is outlined and described in detail below:

| Client Side of NetCTL Protocol | Server Side of NetCTL Protocol |
|---|---|
| Remote control device | Network Attached Device |
| Hello(Remote ID) | → |
|  | ← ACK, Session Key(Key),Top Menu Code |
| List Commands(Key, Menu Code) | → |
|  | ← ACK, List of Command Codes w/Text |
| Do Command(Key, Cmd Code) | → |
|  | ← ACK, Status String, Prompt, New Menu Code |
| Goodbye(Key) | → |
|  | ← ACK |
| Utility Functions |  |
| Get Image(Key, Cmd Code, Pref Type) | → |
|  | ← ACK, type, Image Bits, GridBag Info |
| Get Text(Key, Cmd Code) | → |
|  | ← ACK, Text |
| Get Layout Help(Key, Menu Code) | → |
|  | ← ACK, Grid Layout Info |

Figure 5:
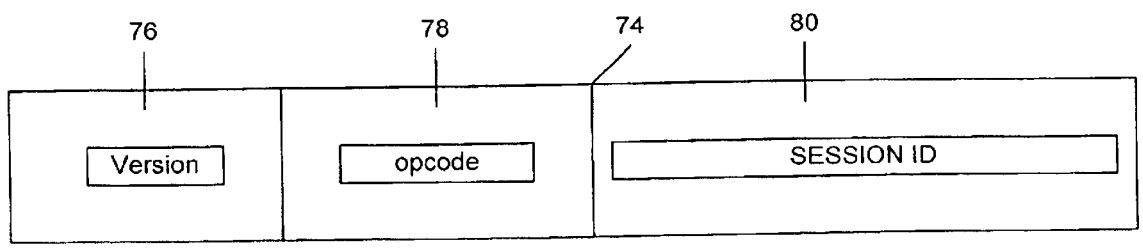
FIG. 5 is a block diagram showing the frame format of the header for client side messages used in the illustrated embodiment.

The illustrative embodiment of the present invention uses a frame format for messages between the remote control device 4 and the network attached device 10. FIG. 5 depicts the format of the message header 74 used in the illustrative embodiment for all of the remote control device's requests. The header 74 is 4 bytes in length and includes a 1 byte version code field 76 set to the version number of the protocol, a 1 byte Operation Code (opcode) field 78 set to the number representing the operation currently being performed, and a 2 byte Session ID field 80 set to the identifier number established for messages between the remote control device and the network attached device during the initial contact between the two devices. The Session ID field 80 is set to 0 if the request is the initial "Hello" request of the present invention. Those skilled in the art will recognize that the size of the fields in the frame format may be adjusted in different versions of the protocol without departing from the scope of the present invention.

Figure 6A:
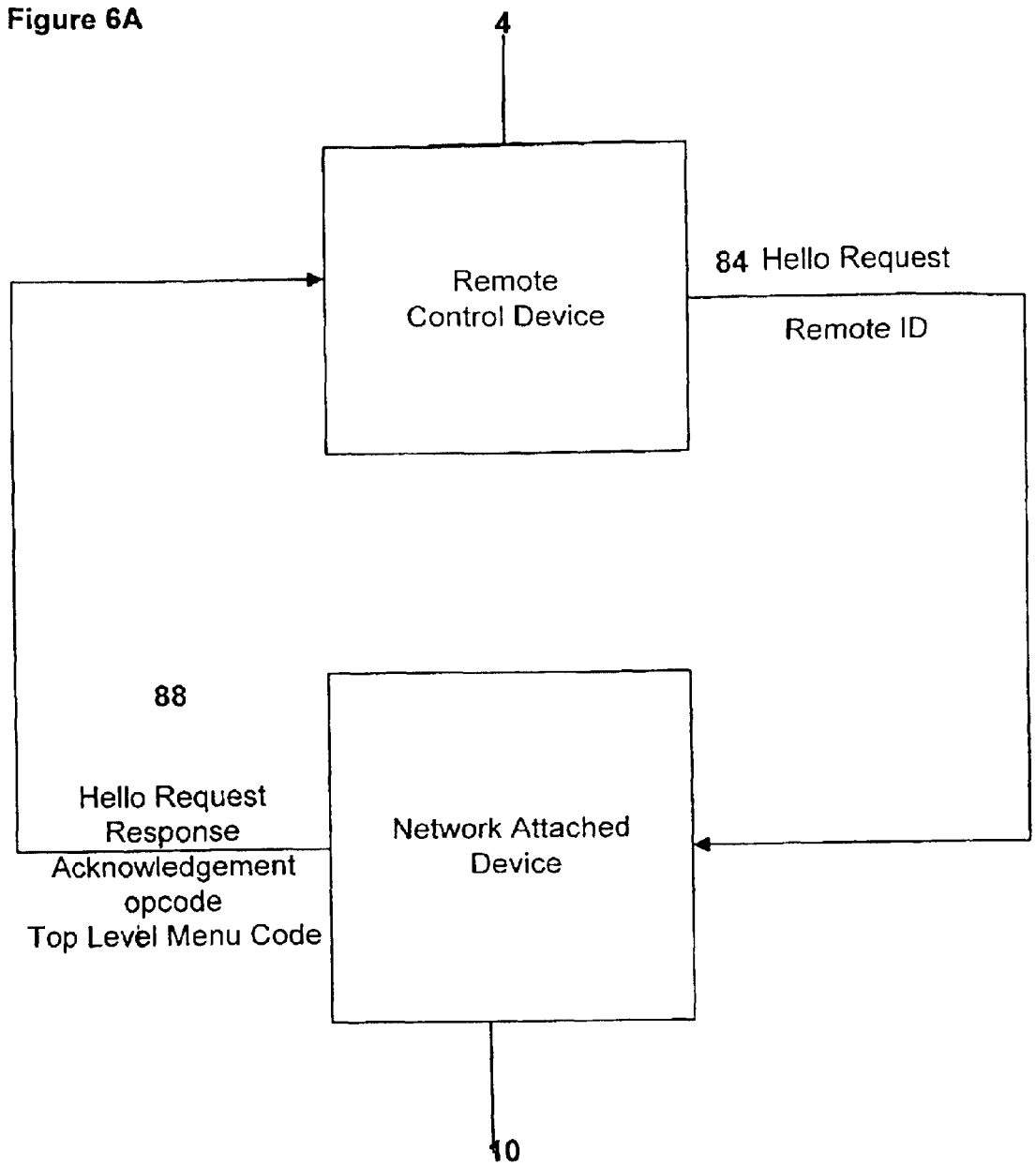
FIG. 6A is a flow chart of the sequence of messages in the illustrative embodiment's Hello request and response.

Once a user of the remote control device 4 indicates a desire to control a registered network attached device 10 by depressing the appropriate button 30, the remote control device attempts to make contact with the selected network attached device as depicted in FIG. 6A. Contact is initiated in the illustrative embodiment by the electronic remote control 4 device sending a "Hello" request (step 84) to the selected network attached device 10. The "Hello" request (step 84) contains an ID for the remote control device 4 so that the selected network attached device 10 can respond directly to the remote control device. The network attached device 10 sends a response (step 88) if available, which includes an acknowledgement, a Session Key and the top level menu code to the remote control device 4. The session key is included in any future messages between the two devices. The Top Level Menu Code is included to allow the remote control device 4 to access the menu of command codes of the network attached device 10.

The frame format used by the remote control device 4 and the network attached device 10 in the "Hello" request and response is depicted in FIG. 6B. The header 90 used in the "Hello" request includes the protocol version number 92, the "Hello" operation code as defined in the protocol 94, and the number "0" in the Session ID field 96 since a message session with the network attached device 10 has not been established. The body of the message 98 includes the electronic remote control ID in the a two byte field 100. The "Hello" response format includes its own header 102 which includes an Acknowledgement field 104, the "Hello" response opcode 106, and a session ID 108 established by the network attached device which serves as a reference number for further messages between the remote control device 4 and the network attached device 10. The body of the response message 110 includes an acknowledgement field 112, the Hello Response Opcode field 114 and a Top Level Menu Code field 116. The Top Level Menu Code 116 identifies the menu holding the list of commands for the selected network attached device 10.

Figure 7A:
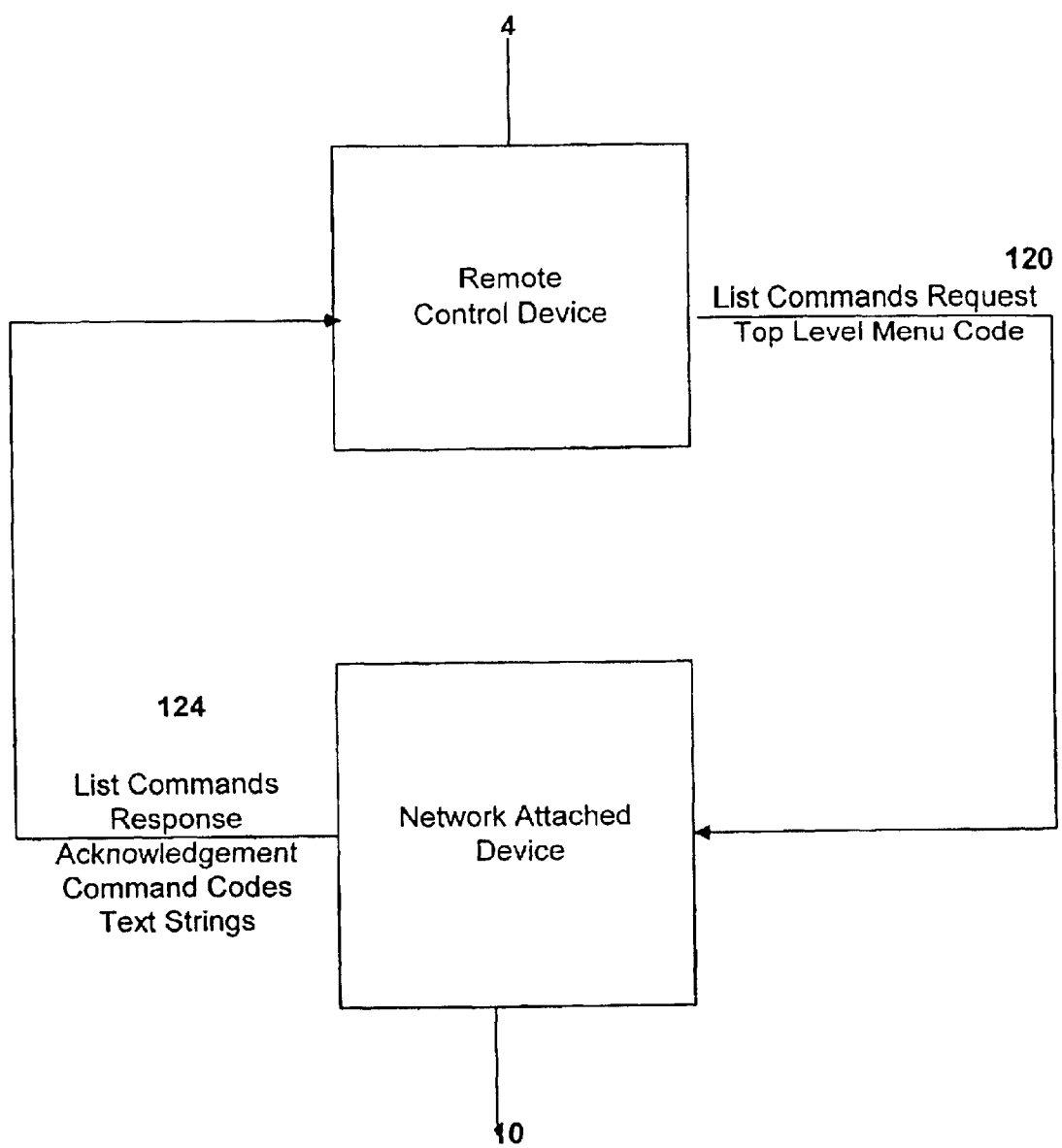
FIG. 7A is a flow chart of the sequence of messages in the illustrative embodiment's List Commands request and response.

FIG. 7A depicts the steps by which the remote control device 4 requests and receives the network attached device's commands and command codes. The remote control device 4 sends a List Commands request (step 120) to the network attached device 10. The List Commands request (step 120) includes the Top Level Menu Code the remote control device 4 had previously received from the network attached device 10. The network attached device 10 sends a response (step 124), which includes an acknowledgement, a list of command codes and a list of text strings representing the names of the available commands, to the remote control device 4.

Figure 7B:
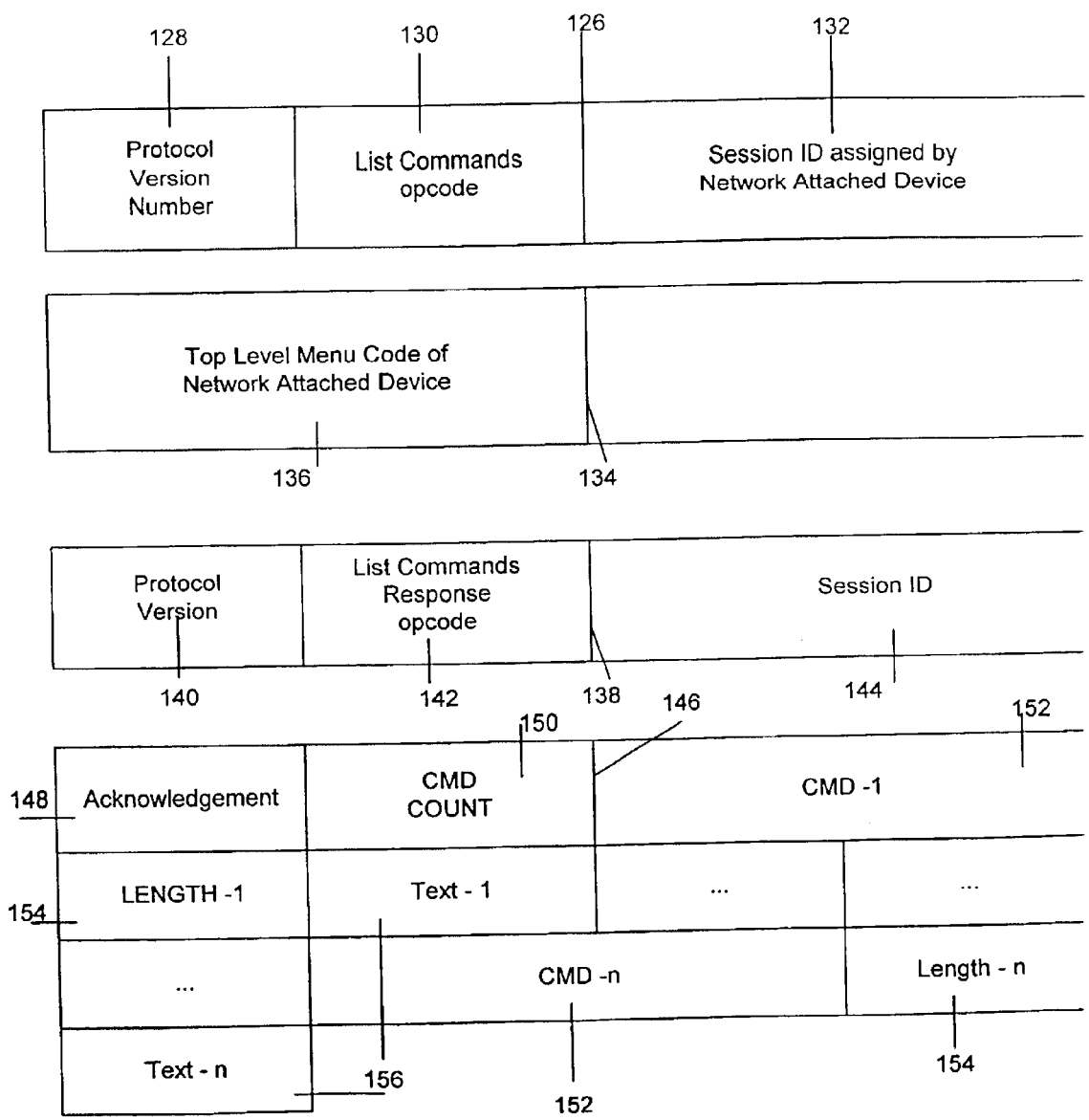
FIG. 7B is a block diagram showing the frame format used in the body of the List Commands Request and the List Commands Response of FIG. 7.

The frame format used by the illustrative embodiment in the List Commands request and response is depicted in FIG. 7B. The List Commands request header 126 includes fields for the protocol version number 128, the List Commands opcode 130, and the session ID 132 assigned by the network attached device 10 in its response to the "Hello" request. The message body 134 includes the Top Level Menu code 136 of the network attached device 10. The List Commands response header 138 includes separate fields for the protocol version 140, the List Commands Response opcode 142, and the Session ID 144. The body of the List Commands response message 146 includes separate fields for the Acknowledgement 148, the Command Count 150 indicating the number of commands being sent, and three fields for each command, the actual command 152, the length of text string field 154 indicating the length of the following field, and the text string field 156 holding the actual name of the command. The three fields are repeated from 1 to n times, with n being the number of commands sent and equal to the number in the Command Count field 150. The text strings representing the names of device commands are displayed on the remote control device 4 display surface 28.

Figure 8A:
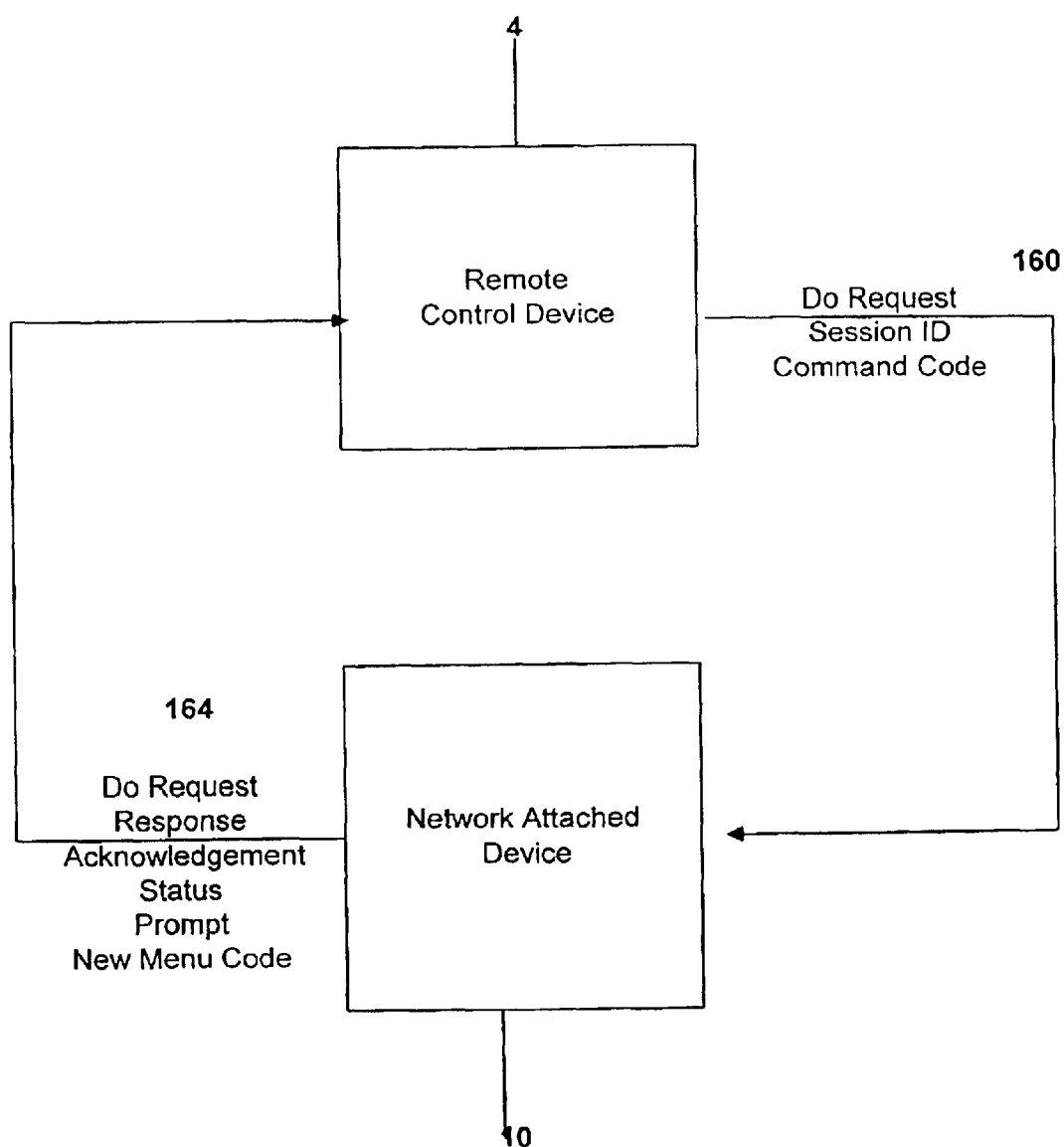
FIG. 8A is a flow chart of the sequence of messages in the illustrative embodiment's Do Command request and response.

FIG. 8A depicts the steps by which the remote control device 4 of the illustrative embodiment requests the network attached device 10 perform a certain operation. The remote control device 4 sends a Do request (step 160) to the network attached device 10. The Do request (step 160) includes the Session ID and one of the network attached device's command codes which the remote control device 4 previously received in the network attached device's List Command response 124. The network attached device's response (step 164) includes an acknowledgement field and may include fields for the status of the network attached device 10 if the network attached device is configured to update its status upon request, and for a prompt message to the user if the operation requires it. The network attached device's response (step 164) also includes a new menu code for the network attached device 10, which identifies the next menu to present to the user.

Figure 8B:
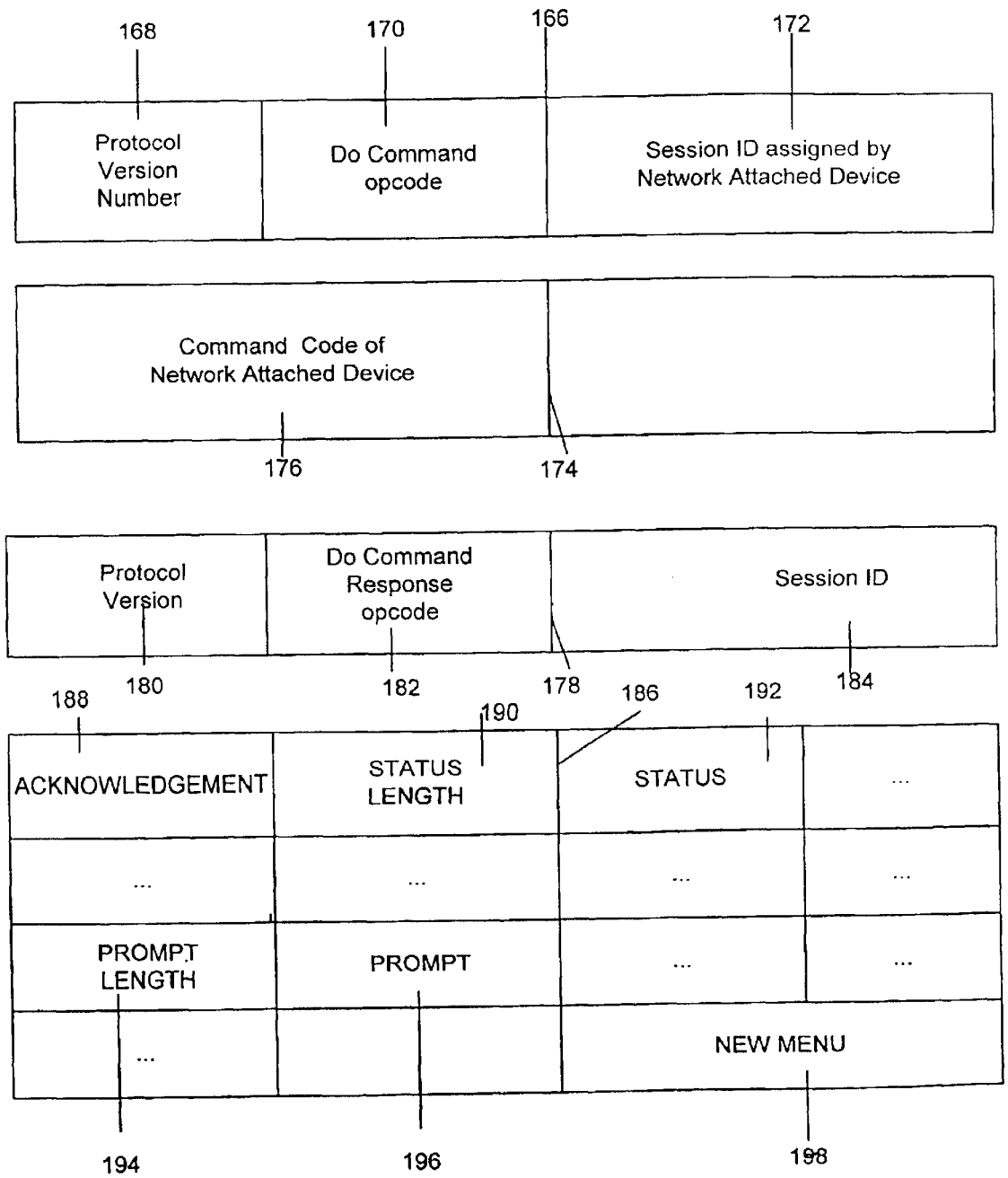
FIG. 8B is a block diagram showing the frame format used in the body of the Do Request and the Do Response of FIG. 8.

The frame format used by the illustrative embodiment in the Do Command request and response is depicted in FIG. 8B. The Do Command request header 166 includes fields for the protocol version number 168, the Do Commands Opcode 170, and the Session ID 172. The message body of the Do command 174 includes a command code for the network attached device 10. The Do response header 178 includes the protocol version header 180, the Do command response code 182 and the Session ID 184. The message body 186 includes an acknowledgement field 188, and a status length field 190 which indicates the length of the following status field 192. The status field contains bits describing the condition of the network attached device 10. The message body 186 also includes a prompt length field 194 which indicates the length of the following Prompt field 196. Some operations require further input from the user of the remote control device 4, and the prompt field is used to send a text message back to the user from the network attached device 10. The Do response message format also includes a new menu code 198 which provides a different menu for the network attached device 10. Those skilled in the art will recognize that both the status length field 190 and the prompt length field 194 may in some circumstances be set to 0 and the corresponding Status 192 and Prompt 196 fields may be empty. The Status field will be empty if the network attached device 10 does not provide updated device information to the remote control device 4. The Prompt field 196 will be empty if the network attached device 10 is able to complete the operation requested in the Do request 160 without further information from the user of the remote electronic control device 4.

Figure 9A:
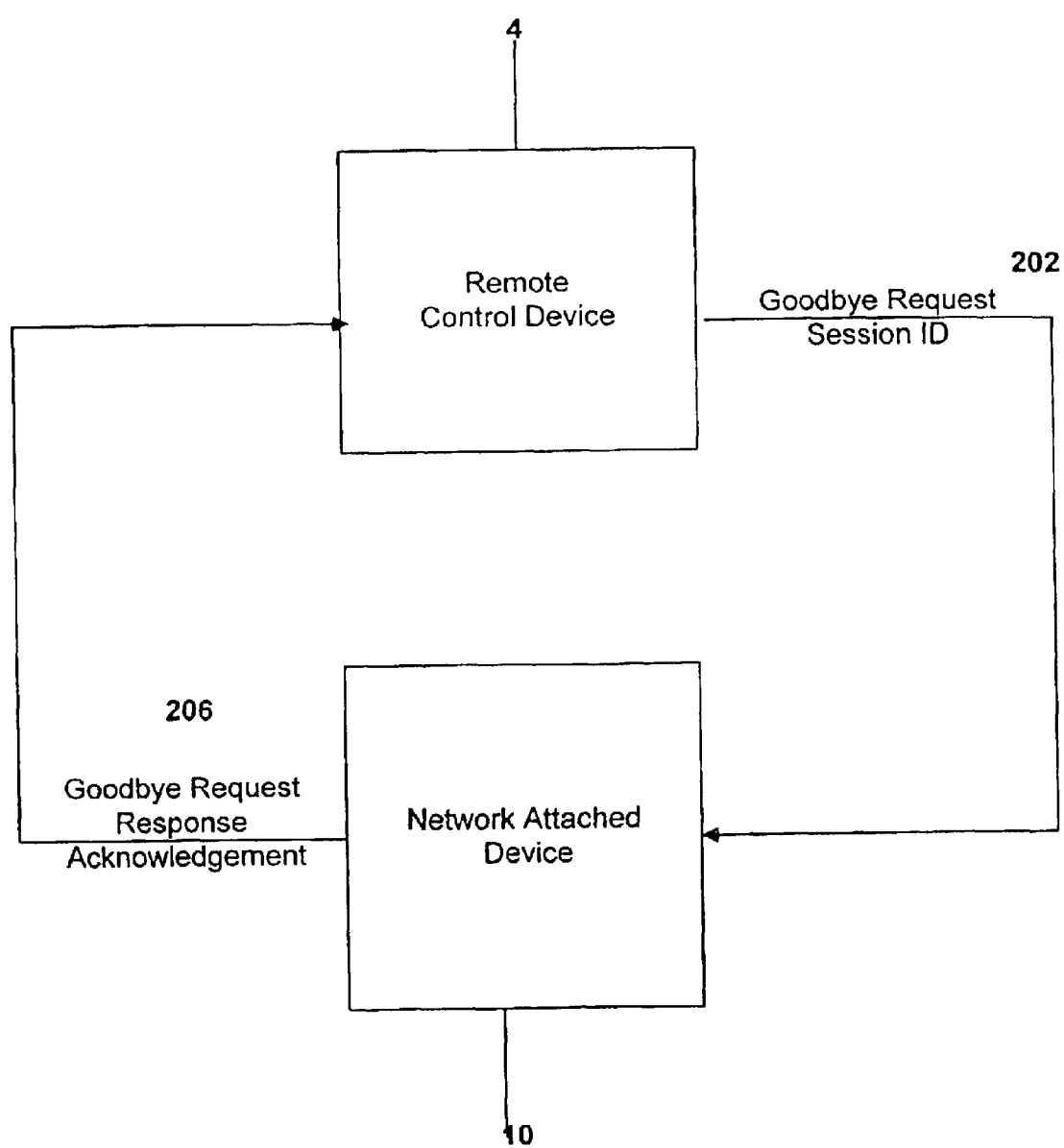
FIG. 9A is a flow chart of the sequence of messages in the illustrative embodiment's Goodbye Command request and response.

FIG. 9A depicts the steps by which the remote control device 4 of the illustrative embodiment requests the network attached device 10 terminate the message session. The remote control device 4 sends a Goodbye request (step 202) to the network attached device 10. The Goodbye request (step 202) includes the Session ID. The network attached device's response (step 206) includes an acknowledgement.

Figure 9B:
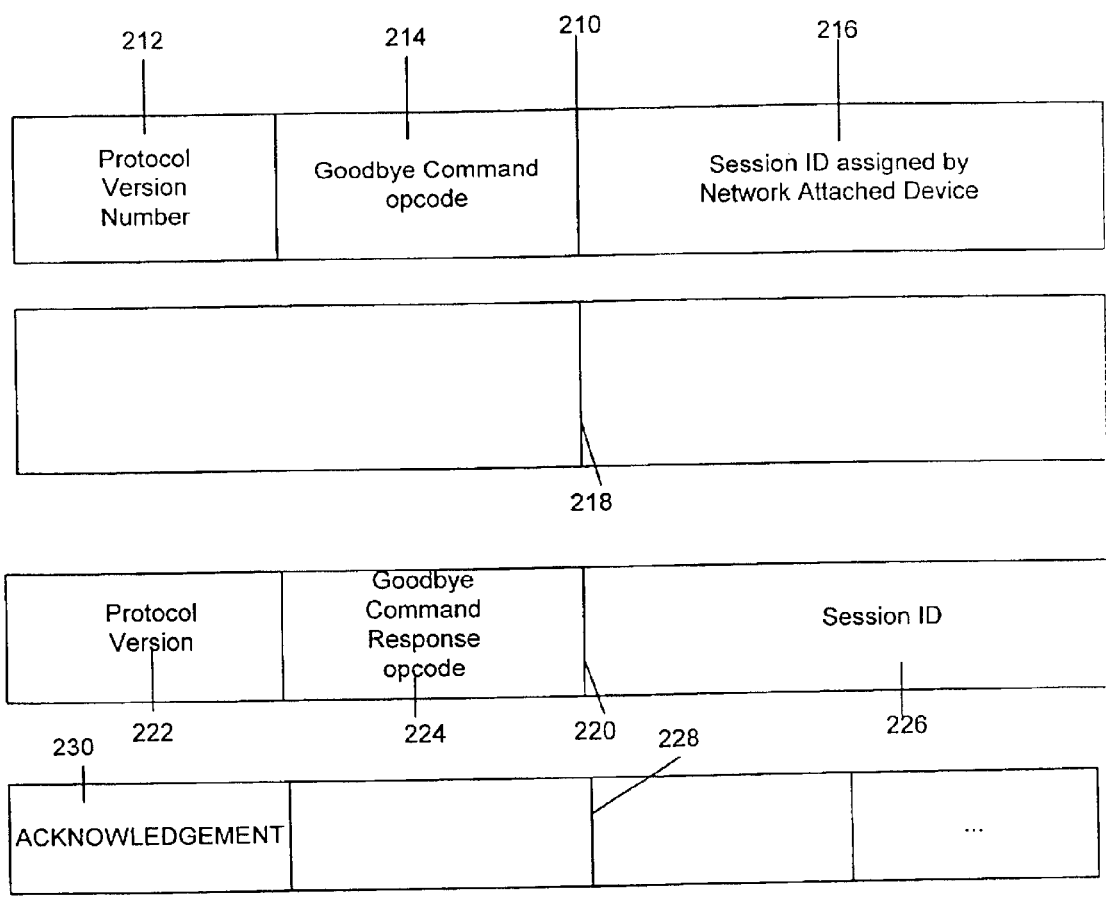
FIG. 9B is a block diagram showing the frame format used in the body of the Goodbye Request and the Goodbye Response of FIG. 9.

The frame format used by the illustrative embodiment in the Goodbye Command request and response is depicted in FIG. 9B. The Goodbye Command request header 210 includes fields for the protocol version number 212, the Goodbye Commands Opcode 214, and the Session ID 216. The message body of the Goodbye command 218 is empty. The Goodbye response header 220 includes the protocol version field 222, the Goodbye Command response code field 224 and the Session ID field 226. The message body 228 includes an acknowledgement field 230.

Figure 10A:
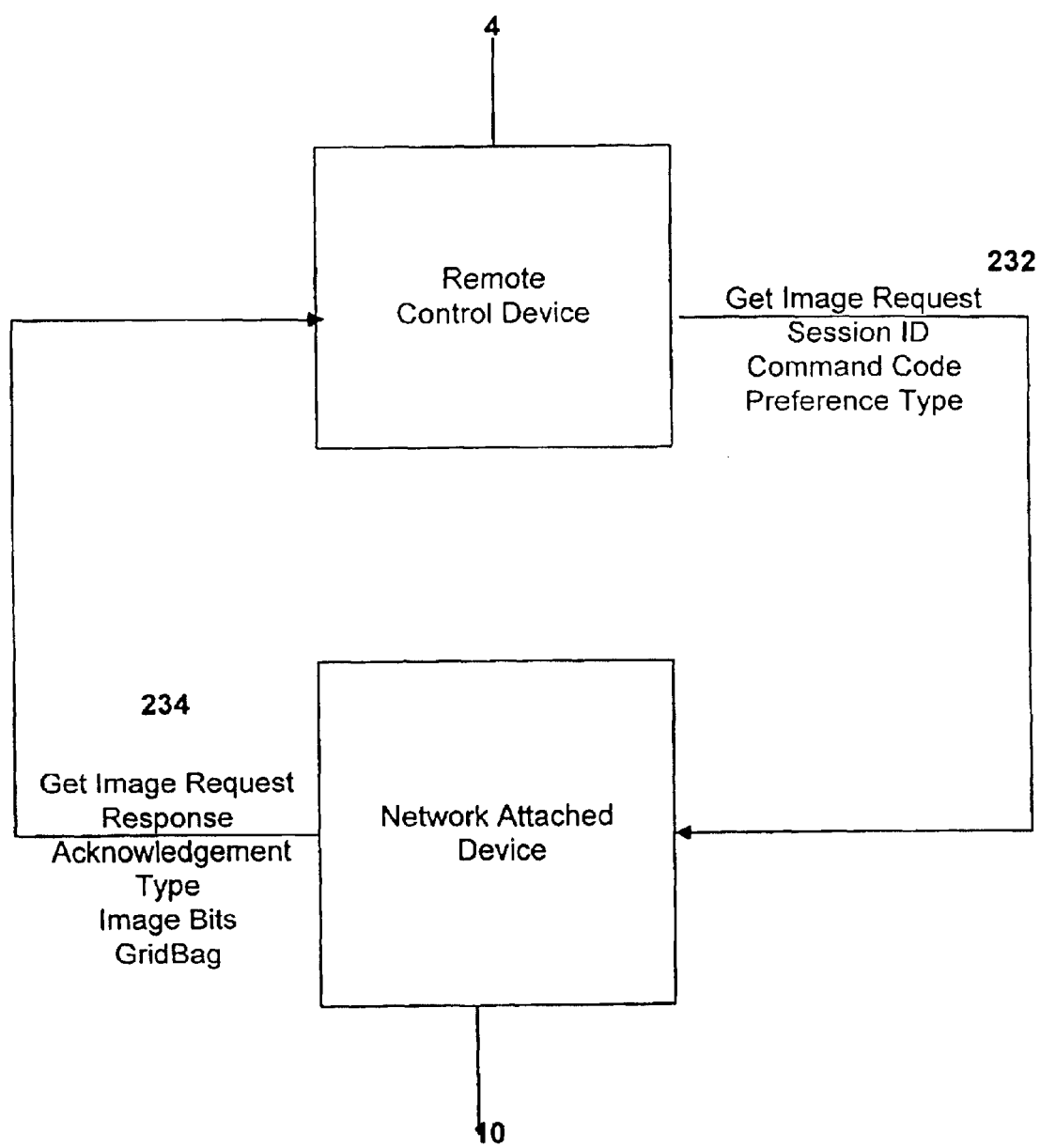
FIG. 10A is a flow chart of the sequence of messages in the illustrative embodiment's Get Image Command request and response.

The illustrative embodiment also includes utility functions that allow the remote control device 4 to obtain additional information about a device's preferred control pad layout and additional button image information. If the user of the remote control device 4 wishes to have images to display instead of text, the remote control device can query the network attached device 10 for them directly by sending the Get Image opcode. FIG. 10A depicts the steps by which the remote control device 4 requests the network attached device 10 send image data. The remote control device 4 sends a Get Image request (step 232) to the network attached device 10. The Get Image request (step 232) includes the Session ID, the Command Code for providing the data, and a Preference Type listing the particular type of image requested (i.e.: JPEG, GIF, BMP, etc.). The network attached device's response (step 234) includes an acknowledgement or error message, an indication of the type of image being sent, the image bits themselves, and miscellaneous information associated with the image).

Figure 10B:
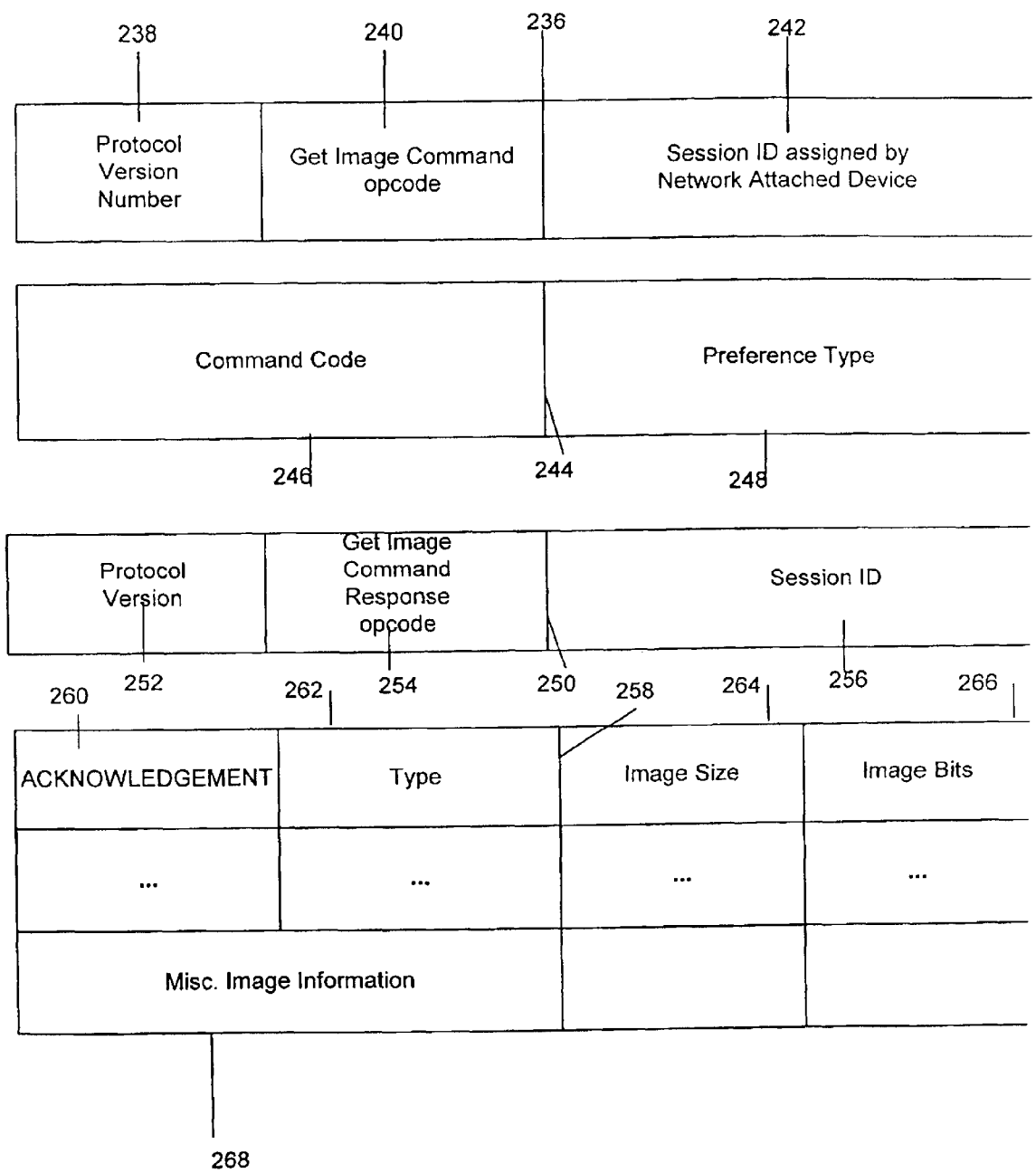
FIG. 10B is a block diagram showing the frame format used in the body of the Get Image Request and the Get Image Response of FIG. 10.

The frame format used by the illustrative embodiment in the Get Image Command request and response is depicted in FIG. 10B. The Get Image Command request header 236 includes fields for the protocol version number 238, the Get Image Commands Opcode 240, and the Session ID 242. The message body of the Get Image command 244 includes fields for a command code 246, and a preference type 248. The Get Image response header 250 includes fields for the protocol version header 252, the Get Image Command response code 254 and the Session ID 256. The message body 258 includes fields for an acknowledgement 260, type (JPEG, GIF, BMP, etc.) 262, image size 264, listing the image size in bytes, image bits 266, the image bits themselves, and a miscellaneous image information field 268.

Figure 11A:
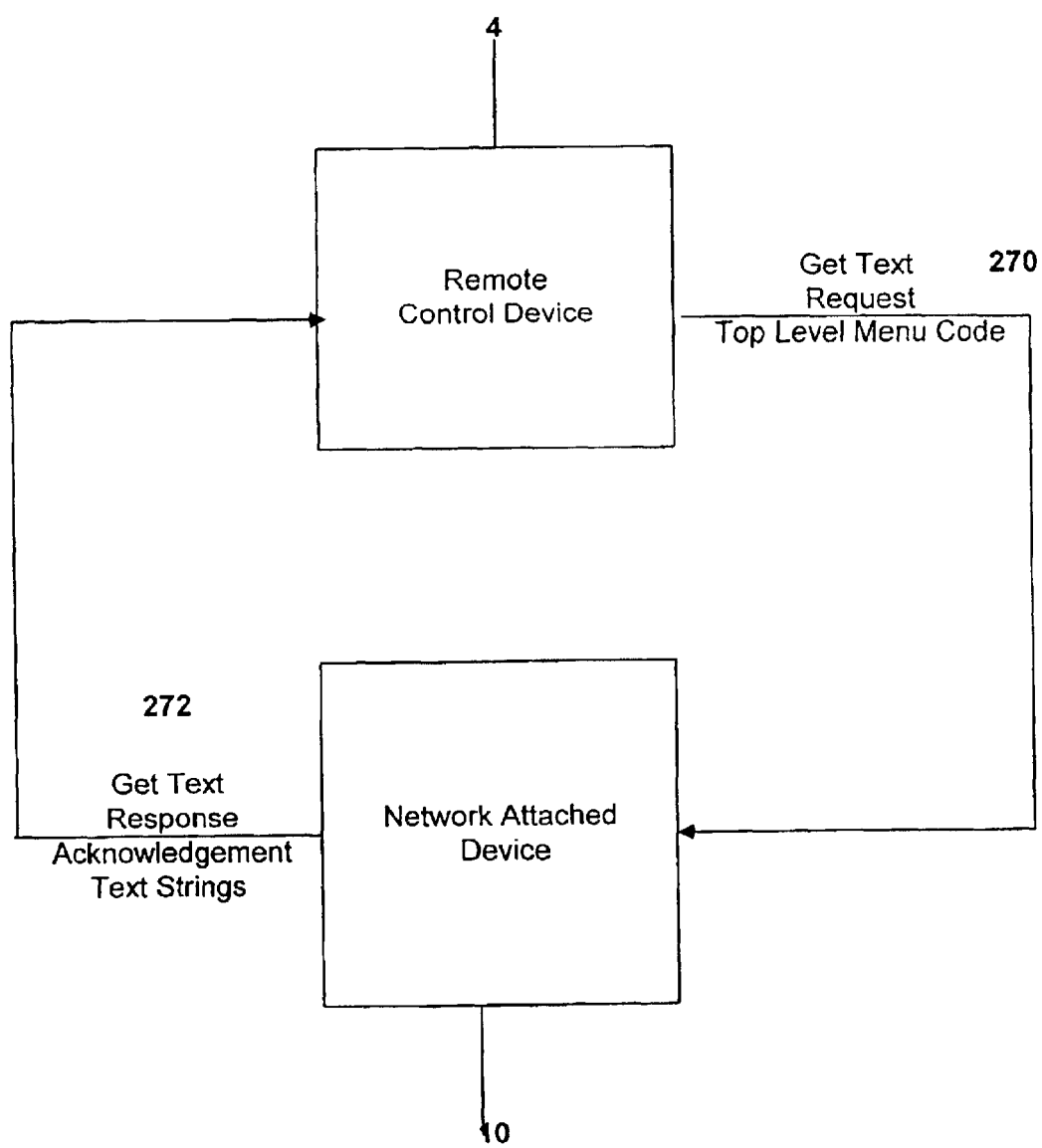
FIG. 11A is a flow chart of the sequence of messages in the illustrative embodiment's Get Text Command request and response.

FIG. 11A depicts the steps by which the remote control device 4 requests the network attached device 10 send text data. The remote control device 4 sends a Get Text request (step 270) to the network attached device 10. The Get Text request (step 270) includes the Session ID and the appropriate Command Code. The network attached device's response (step 272) includes an acknowledgement and the requested text.

Figure 11B:
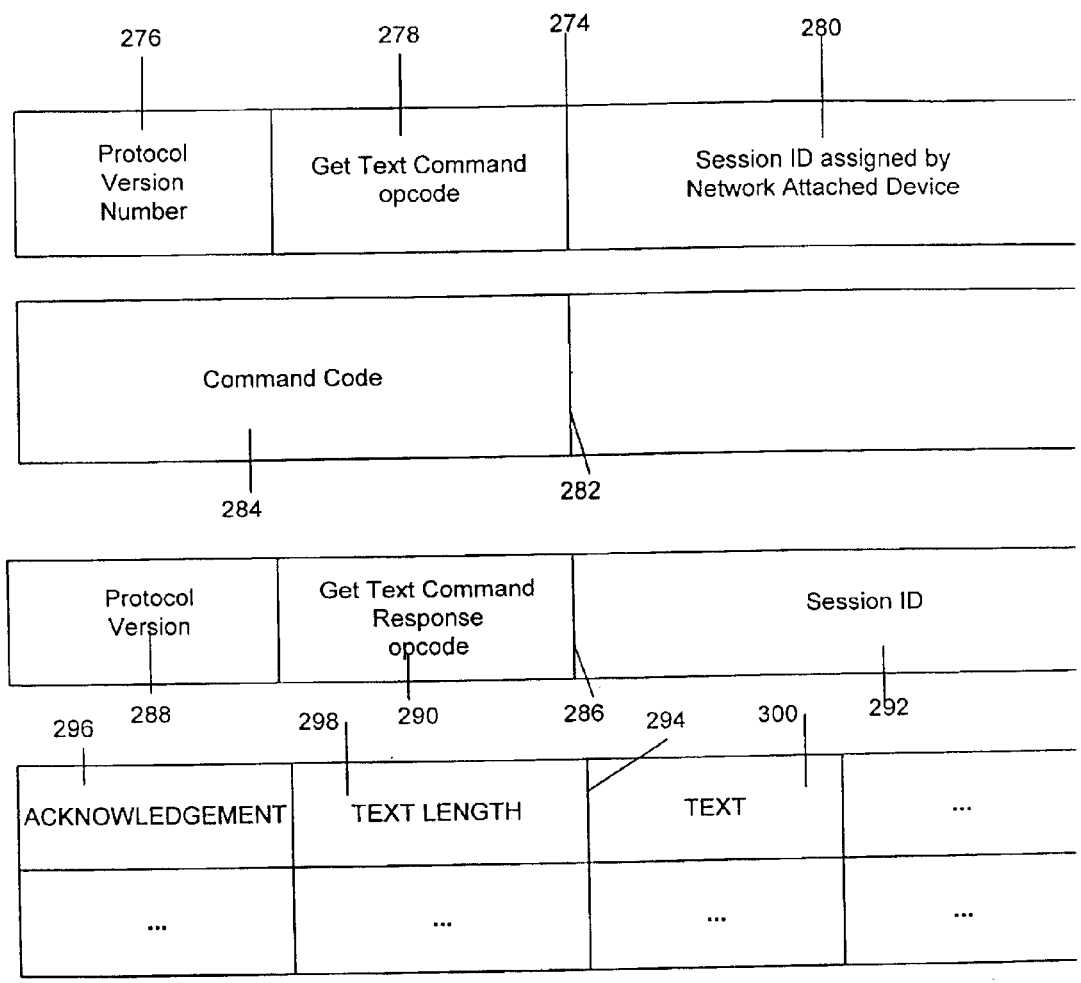
FIG. 11B is a block diagram showing the frame format used in the body of the Get Text Request and the Get Text Response of FIG. 11.

The frame format used by the illustrative embodiment in the Get Text Command request and response is depicted in FIG. 11B. The Get Text Command request header 274 includes fields for the protocol version number 276, the Get Text Commands Opcode 278, and the Session ID 280. The message body of the Get Text command 282 includes a field for the appropriate command code 284. The Get Text response header 286 includes fields for the protocol version header 288, the Get Text Command response code 290 and the Session ID 292. The message body 294 includes fields for an acknowledgement 296, text length 298, which indicates the length of the upcoming text field 300, which holds the actual text bits.

Figure 12A:
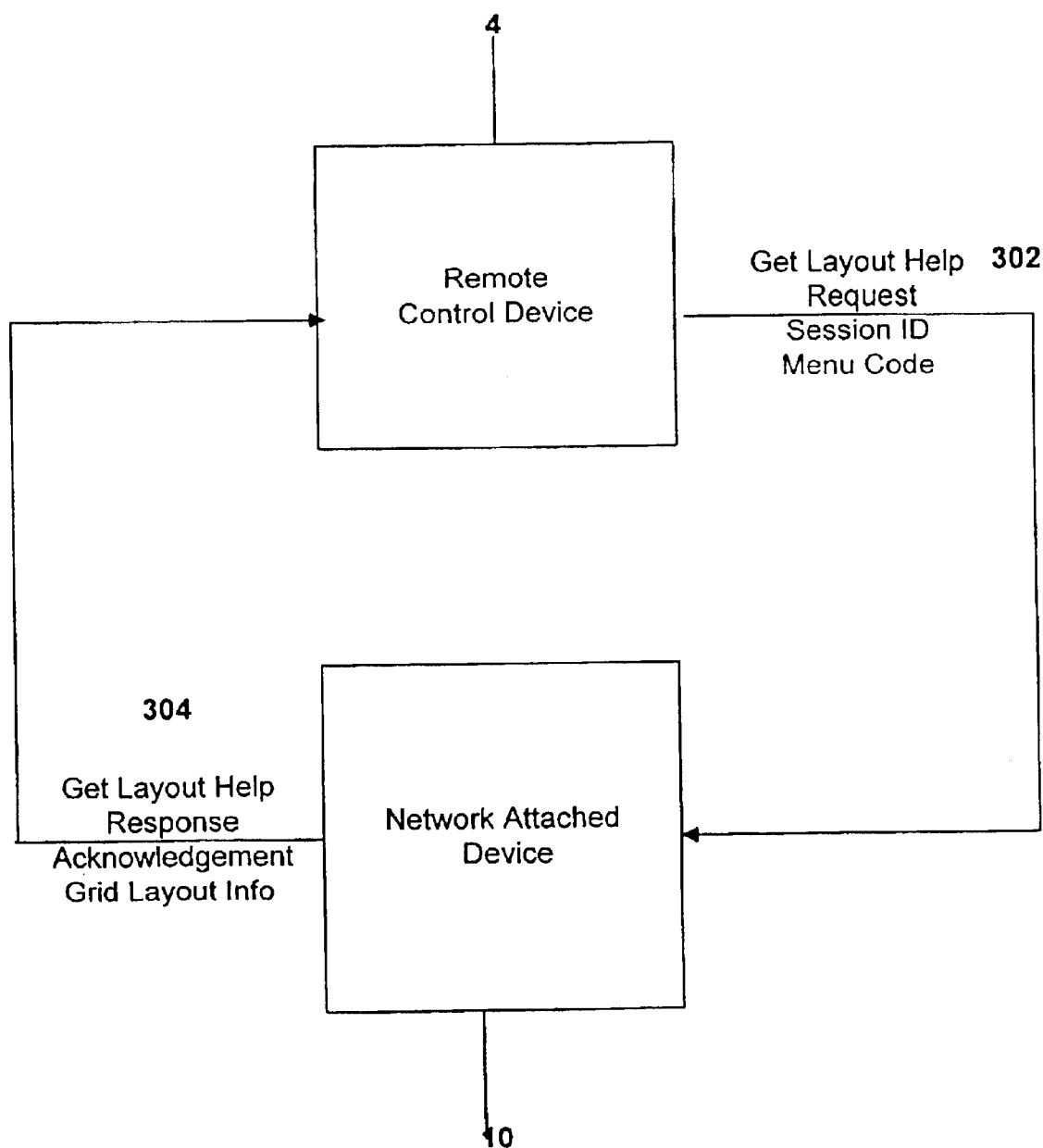
FIG. 12A is a flow chart of the sequence of messages in the illustrative embodiment's Get Layout Help Command request and response.

FIG. 12A depicts the steps by which the remote control device 4 requests the network attached device 10 send grid layout information for the display surface 28. The remote control device 4 sends a Get Layout Help request (step 302) to the network attached device 10. The Get Layout Help request (step 304) includes the Session ID and the appropriate Menu Code. The network attached device's response (step 304) includes an acknowledgement and the grid layout information.

Figure 12B:
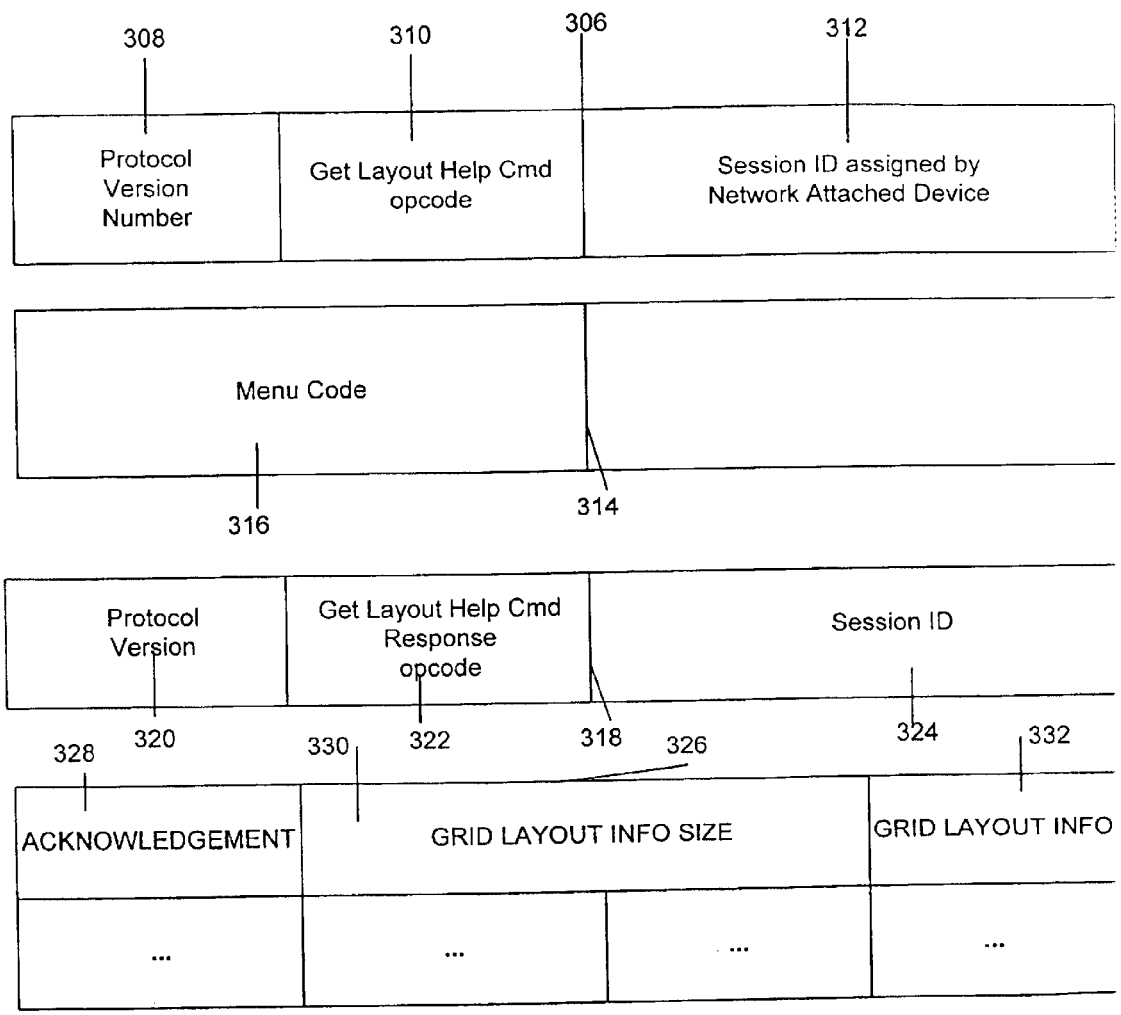
FIG. 12B is a block diagram showing the frame format used in the body of the Get Layout Help Request and the Get Layout Help Response of FIG. 12.

The frame format used by the illustrative embodiment in the Get Layout Help Command request and response is depicted in FIG. 12B. The Get Layout Help Command request header 306 includes fields for the protocol version number 308, the Get Layout Help Command Opcode 310, and the Session ID 312. The message body of the Get Layout Help command 314 includes a field for the menu code 316 for the commands for which the layout help is sought. The Get Layout Help response header 318 includes fields for the protocol version header 320, the Get Layout Help Command response code 322 and the Session ID 324. The message body 326 includes fields for an acknowledgement 328, grid layout information size 330, which indicates the length of the upcoming grid layout information field 332, which holds the actual grid layout information. The remote control device 4 uses this information to arrange the information shown on its display surface 28.

It will thus be seen that the invention efficiently attains the objects made apparent from the preceding description. Since certain changes may be made without departing from the scope of the present invention, it is intended that all matter contained in the above description or shown in the accompanying drawings be interpreted as illustrative and not in a literal sense. Practitioners of the art will realize that the separate requests and responses illustrated herein may have fields added or deleted from the request or response and additional requests and responses may be added from one protocol version to the next without departing from the scope of the present invention.

I claim:

1. In a remote control device interfaced with a network, said network having at least one additional device coupled thereto, a method, comprising the steps of:

providing a protocol enabling the dynamic retrieval of at least one command codes for said at least one additional device, said protocol being executed by said at least one additional device and said remote control device;

dynamically locating and identifying said at least one additional device using said remote control device, dynamically retrieving the command codes for said identified device; and with the protocol, controlling the operations of said identified device using said dynamically retrieved command codes.

2. The method of claim 1 wherein said method further comprises the step of sending communications over an Internet Protocol (IP) based network using the protocol.

3. The method of claim 1 wherein said method further comprises the step of:

dynamically locating and identifying multiple devices with the remote control device using the protocol.

4. The method of claim 1 wherein said method further comprises the step of:

controlling the operations of multiple devices with the remote control device using the protocol.

5. The method of claim 1 wherein said method further comprise the steps of:

sending a request using said protocol from said remote control to said identified device for a list of command codes; and receiving at said remote control a list of command codes from the identified device using the protocol.

6. The method of claim 5 wherein said method further comprises the step of:

sending received command codes to said identified device from the remote control device using the protocol.

7. The method of claim 1 wherein said method further comprises the step of:

displaying on the display surface of said remote control a list of the identified devices available to a user.

8. The method of claim 1 wherein said method comprises the step of:

selecting a device to control from among those fisted on the display surface of the remote control device, said selection performed by a user of the remote control device.

9. The method of claim 1 wherein said method further comprises the steps of:

with the protocol, said identified device receiving a request for its command codes from said remote control device, and with the protocol, said identified device providing said command codes to the remote control device.

10. The method of claim 1 wherein said method further comprise the step of:

with the protocol, said identified device providing its command codes and an associated text suing for each code to the remote control device in response to a request from the remote control device.

11. The method of claim 1 wherein said method further comprises the step of:

with the protocol, said identified device providing its command codes and an associated graphical image for each command code to the remote control device in response to a request from the remote control device.

12. The method of claim 1 wherein said method further comprises the step of:

with the protocol, said identified device providing its command codes and an associated graphical image and text string for each command code to the remote control device, in response to a request from the remote control device.

13. The method of claim 1 wherein said method further comprises the step of:

with the protocol, said identified device receiving and executing one of its command codes from said remote control device.

14. A medium for use with a remote control device interfaced with a network, said network having at least one additional device coupled thereto, said medium holding computer-executable instructions for performing a method comprising the steps of:

providing a protocol enabling the dynamic retrieval of at least one command codes for said at least one additional device, said protocol beg executed by said at least one additional device and said remote control device;

dynamically locating and identifying said at least one additional device using said remote control device;

dynamically retrieving the command codes for said identified device; and with the protocol, controlling the operations of said identified device using said dynamically retrieved command codes.

15. The medium of claim 14 wherein said method further comprises the step of:

with the protocol, sliding communications over an Internet Protocol (IP) based network.

16. The medium of claim 14 wherein said network is located in a motor vehicle.

17. The medium of claim 14 wherein said remote control device includes a touch pad display screen.

* * * * *